United States Patent
Xu et al.

(10) Patent No.: US 11,123,859 B2
(45) Date of Patent: Sep. 21, 2021

(54) MAGNETICALLY DRIVEN HOPPING SOFT ROBOT BASED ON MAGNETICALLY PROGRAMMED TEMPERATURE-SENSITIVE HYDROGELS

(71) Applicant: Jiangsu University, Jiangsu (CN)

(72) Inventors: Lin Xu, Jiangsu (CN); Siyuan Liu, Jiangsu (CN); Jianning Ding, Jiangsu (CN); Kun Zhang, Jiangsu (CN); Jiaqi Li, Jiangsu (CN); Chuncheng Liu, Jiangsu (CN); Guanggui Cheng, Jiangsu (CN); Zhongqiang Zhang, Jiangsu (CN); Xiaodong Wang, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 17/042,947

(22) PCT Filed: Mar. 25, 2020

(86) PCT No.: PCT/CN2020/081058
§ 371 (c)(1),
(2) Date: Sep. 29, 2020

(87) PCT Pub. No.: WO2020/192679
PCT Pub. Date: Oct. 1, 2020

(65) Prior Publication Data
US 2021/0094171 A1 Apr. 1, 2021

(30) Foreign Application Priority Data
Mar. 27, 2019 (CN) .......................... 201910235375.9

(51) Int. Cl.
*B25J 9/10* (2006.01)
*B62D 57/02* (2006.01)
(Continued)

(52) U.S. Cl.
CPC ............ *B25J 9/1095* (2013.01); *B62D 57/02* (2013.01); *C08J 3/075* (2013.01); *F03G 7/06* (2013.01); *B82Y 25/00* (2013.01); *B82Y 30/00* (2013.01)

(58) Field of Classification Search
None
See application file for complete search history.

(56) References Cited

U.S. PATENT DOCUMENTS

2014/0031750 A1* 1/2014 Ordeig .............. A61M 5/14276
604/131

FOREIGN PATENT DOCUMENTS

| CN | 106220793 | 12/2016 |
|---|---|---|
| CN | 107055454 | 8/2017 |

(Continued)

OTHER PUBLICATIONS

"International Search Report (Form PCT/ISA/210)" of PCT/CN2020/081058, dated Jun. 28, 2020, pp. 1-5.

(Continued)

*Primary Examiner* — Jeffrey D Washville
(74) *Attorney, Agent, or Firm* — JCIP Global Inc.

(57) ABSTRACT

A magnetically driven hopping soft robot based on magnetically programmed temperature-sensitive hydrogels includes first moving bodies and a second moving body. Several first moving bodies are distributed evenly on a bottom portion of the second moving body. The first moving bodies are made of a temperature-responsive hydrogel containing magnetic particles. An alternating magnetic field is applied to the first moving bodies to cause the first moving bodies to deform due to magnetocaloric effect. The first moving bodies have a two-layered structure. A first layer is made of a double-network cross-linked hydrogel and a second layer is made of a magnetic temperature-responsive (Continued)

hydrogel with added magnetic nanoparticles. An alternating magnetic field is applied to the first moving bodies in a manner that an amount of deformation of the second layer is greater than that of the first layer. The second layer is made of a temperature-responsive hydrogel with added magnetic nanoparticles.

5 Claims, 10 Drawing Sheets

(51) Int. Cl.
*C08J 3/075* (2006.01)
*F03G 7/06* (2006.01)
*B82Y 25/00* (2011.01)
*B82Y 30/00* (2011.01)

(56) References Cited

FOREIGN PATENT DOCUMENTS

| CN | 108395548 | 8/2018 |
| CN | 110040189 | 7/2019 |
| KR | 20180130419 | 12/2018 |

OTHER PUBLICATIONS

"Written Opinion of the International Searching Authority (Form PCT/ISA/237)" of PCT/CN2020/081058, dated Jun. 28, 2020, pp. 1-6.

* cited by examiner

MAGNETICALLY DRIVEN HOPPING SOFT ROBOT BASED ON MAGNETICALLY PROGRAMMED TEMPERATURE-SENSITIVE HYDROGELS

CROSS-REFERENCE TO RELATED APPLICATION

This application is a 371 of international application of PCT application serial no. PCT/CN2020/081058, filed on Mar. 25, 2020, which claims the priority benefit of China application no. 201910235375.9, filed on Mar. 27, 2019. The entirety of each of the above mentioned patent applications is hereby incorporated by reference herein and made a part of this specification.

BACKGROUND

Technical Field

The present invention relates to the field of soft robots, and in particular to a magnetically driven hopping soft robot based on magnetically programmed temperature-sensitive hydrogels.

Description of Related Art

Intelligent hydrogels, like organisms, can sense the slight stimulus from an external energy field such as temperature, light, electricity, chemistry or magnetism and change in conformation, producing reversible responses of physical and chemical property changes along with significant volume phase transitions. Numerous research findings have emerged in terms of soft drivers or robots developed that are powered by volume phase transitions of intelligent hydrogels presented under stimulus from external energy fields. Among such intelligent hydrogels, a Poly(N-isopropylacrylamide, PNIPAM) temperature-sensitive hydrogel goes through intense reversible swelling-shrinkage volume phase transitions near its Lower Critical Solution Temperature (LCST). This intelligent property of strong response to weak stimulus of temperature-sensitive hydrogels enables energy conversion from thermal energy to mechanical energy and has enormous potentials in application to the field of bionic soft robots, drivers, etc.

Although hydrogel soft robots have presented squirming movement functions similar to mollusks like maggots, worms, etc., they have drawbacks such as slow driving speed and low efficiency of driving energy conversion. Current research on hydrogel soft robots is mainly focused on crawling and squirming movements, and so far no patent documents have disclosed hopping movements.

A patent disclosed a multi-directional squirming soft robot. In this patent, the body has a circular shape having six comb-tooth electrostatic chucks distributed evenly around it. The six electrostatic chucks are attached to the central body by a shape memory alloy. The six "feet" are fixed to the robot body through electrostatic adsorption and individual feet are controlled independently by the shape memory alloy in such a manner as to enable squirming movements in various directions. The robot of this patent is easily controllable and soft in configuration, miniature and ultra-thin, and has desirable gap crossing capability.

A patent disclosed a soft crawling robot capable of turning. The body of this patent has a cuboidal shape having two driving and controlling modules connected to its both ends. The crawling/turning line inside the body, in combination with the driving and friction at both ends, enables crawling/turning of the whole body. The robot of this invention is capable of multiple movement functions, such as forward movement, backward movement, turning left, turning right, etc., to adapt better to various scenarios.

A patent disclosed a pneumatic bionic soft crawling robot. The body of this patent includes multiple stretch actuators assembled via a middle connector. Several airways are distributed inside the stretch actuators. The change in form of each actuator is enabled through regulation of the air pressure. The changes in form of the multiple units are combined to form the movement posture of the robot body. In addition, a rigid bristle structure is arranged on the foot of the robot to improve its grip to ground and solve the drawbacks of tendency of slippage and poor flexibility.

SUMMARY

In view of the drawbacks of prior art, the present invention provides a magnetically driven hopping soft robot based on magnetically programmed temperature-sensitive hydrogels. When the magnetically programmed temperature-sensitive hydrogel is placed in an alternating magnetic field, the internal temperature of the hydrogel rises due to magneto-caloric effect, causing longitudinal shrinking of the magnetically programmed temperature-sensitive hydrogel. One layer in the leg is unchanged whereas another layer shrinks, which causes the whole leg to change in a bent form. The alternating magnetic field is added to make the leg bend and lower the overall center of gravity of the robot. At the moment when the alternating magnetic field is removed, the elastic potential energy stored in the leg of the robot is released and pushes the robot to move upward. When its leg is straightened, the robot will move further upward over a distance due to the inertia, thereby enabling the robot to hop.

The present invention achieves the technical object described above by the following technical means.

A magnetically driven hopping soft robot based on magnetically programmed temperature-sensitive hydrogels includes first moving bodies and a second moving body. A plurality of the first moving bodies are distributed evenly on a bottom portion of the second moving body. The first moving bodies are made of a temperature-responsive hydrogel containing magnetic particles. An alternating magnetic field is applied to the first moving bodies to cause the first moving bodies to deform.

Further, the first moving bodies have a two-layered structure. A first layer is made of a cross-linked double-network hydrogel and a second layer is made of a magnetic temperature-responsive hydrogel. An alternating magnetic field is applied to the first moving bodies in such a manner that an amount of deformation of the second layer is greater than that of the first layer.

Further, the second layer is made of a temperature-responsive hydrogel with added magnetic nanoparticles, and magnetically programmed treatment is performed on the temperature-responsive hydrogel containing added magnetic nanoparticles, so that the magnetic nanoparticles are distributed evenly in a rectangular array inside the temperature-responsive hydrogel.

Further, the magnetic nanoparticles in the rectangular array are arranged densely in a height direction and arranged sparsely in a width direction inside the temperature-responsive hydrogel.

Further, the magnetic nanoparticles in the rectangular array are arranged sparsely in a height direction and arranged densely in a width direction inside the temperature-responsive hydrogel.

Further, the magnetic nanoparticles in the rectangular array have an included angle of 60° to 120° between a length direction and a height direction inside the temperature-responsive hydrogel.

Further, the magnetically programmed treatment includes adding magnetic nanoparticles to the temperature-responsive hydrogel and putting a gelation process of a mixture in a uniform magnetic field environment.

Further, at least two of the first moving bodies are distributed evenly on the bottom portion of the second moving body and the second layer is positioned on an outer side of the first layer. An alternating magnetic field is applied to the second layer to cause the first moving bodies and the second moving body deform into a "π" shape.

The present invention has the following beneficial effects.

1. In the magnetically driven hopping soft robot based on magnetically programmed temperature-sensitive hydrogels of the present invention, a magnetic field is utilized to drive the hydrogels to deform, thereby allowing wireless control and eliminating the constraints of wires.

2. In the magnetically driven hopping soft robot based on magnetically programmed temperature-sensitive hydrogels of the present invention, the body has an integral structure that can be controlled more conveniently and has more stable deformation effects.

3. In the magnetically driven hopping soft robot based on magnetically programmed temperature-sensitive hydrogels of the present invention, the body is made of hydrogels and thus is more suitable for underwater environments.

DESCRIPTION OF THE EMBODIMENTS

The present invention will be further explained with reference to the drawings and specific embodiments, but the protection scope of the present invention is not limited thereto.

A magnetically driven hopping soft robot based on magnetically programmed temperature-sensitive hydrogels according to the present invention includes first moving bodies and a second moving body. Several first moving bodies are distributed evenly on a bottom portion of the second moving body. The first moving bodies are made of a temperature-responsive hydrogel containing magnetic particles. An alternating magnetic field is applied to the first moving bodies to cause the first moving bodies to deform. The first moving bodies have a two-layered structure. The first layer is made of a double-network cross-linked hydrogel and the second layer is made of a magnetic temperature-responsive hydrogel. An alternating magnetic field is applied to the first moving bodies in such a manner that the amount of deformation of the second layer is greater than that of the first layer.

Figure 1:
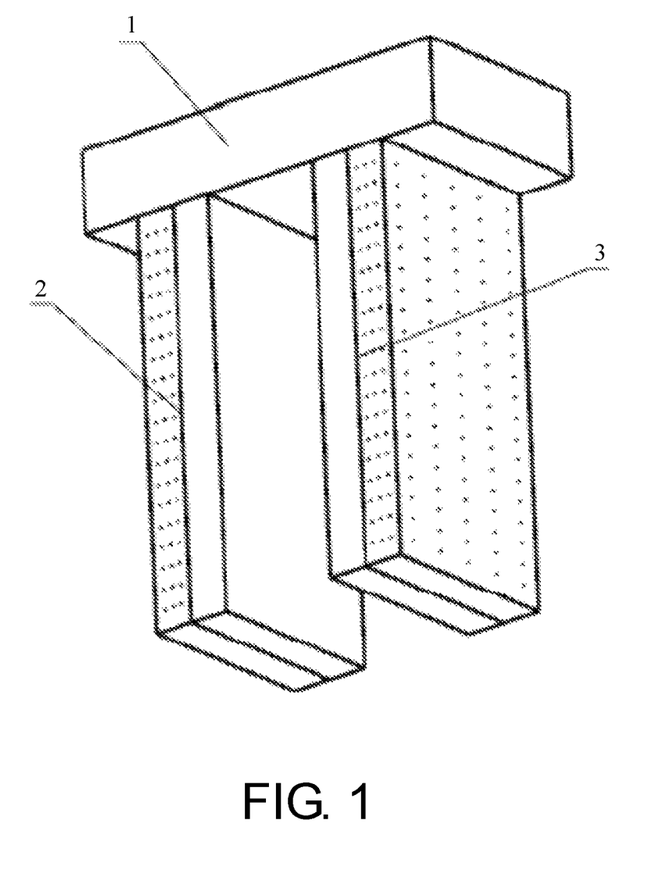
FIG. 1 is a structural view of a magnetically driven hopping soft robot based on magnetically programmed temperature-sensitive hydrogels according to the present invention.
Figure 3:
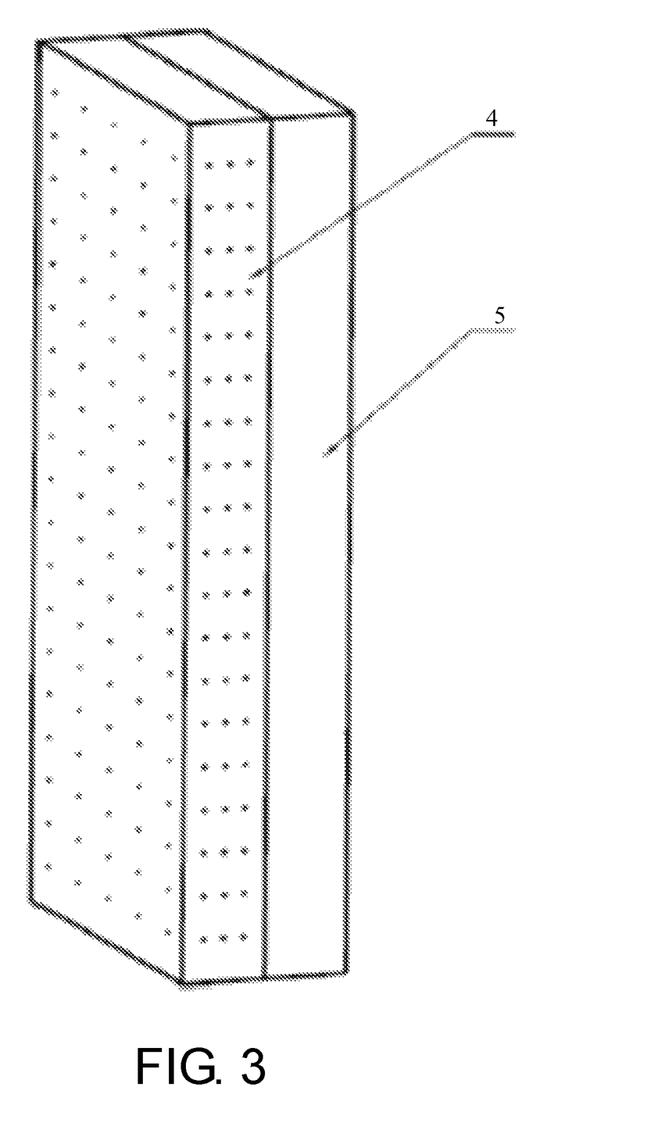
FIG. 3 is a schematic view of a left leg of a robot according to the present invention.
Figure 4:
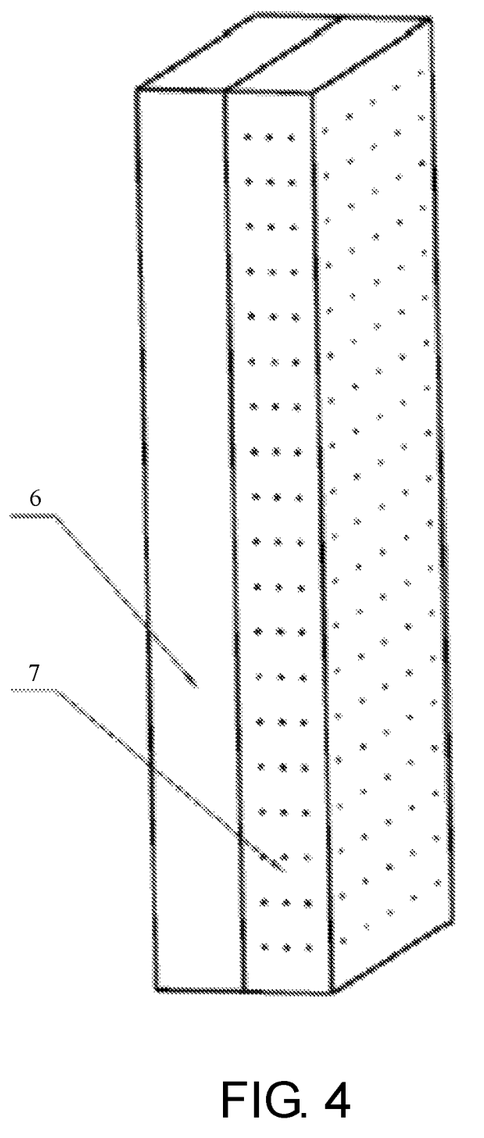
FIG. 4 is a schematic view of a right leg of a robot according to the present invention.
Figure 5:
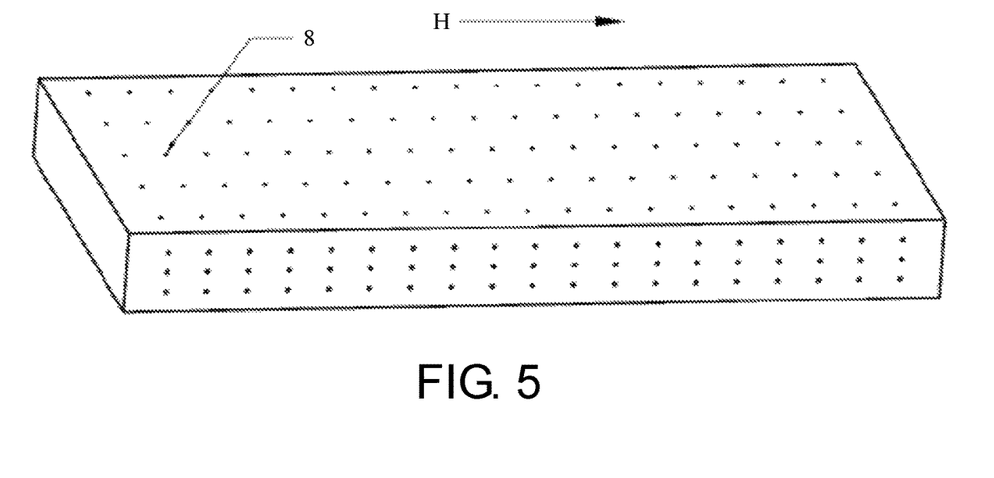
FIG. 5 is a schematic view of the arrangement of magnetic nanoparticles according to the present invention.

In a specific embodiment of the present invention, two first moving bodies are distributed evenly on the bottom portion of the second moving body. As shown in FIG. 1, a left leg 2 of the soft robot and a right leg 3 of the soft robot are adhered to the bottom of the head 1 of the soft robot. The left leg 2 of the soft robot and the right leg 3 of the soft robot are arranged symmetrically, so that the soft robot is in a "π" shape. The left leg 2 of the soft robot and the right leg 3 of the soft robot have the same structure and both have a left and right two-layered structure. The head 1 of the soft robot is made of a non-magnetic double-network cross-linked hydrogel. The head has a size 20 mm long, 10 mm wide and 4 mm thick. As shown in FIG. 3, the left leg 2 of the soft robot has a left and right two-layered structure. The left leg left layer 4 of the soft robot is made of a temperature-responsive hydrogel with added magnetic nanoparticles 8 and has a size 20 mm long, 10 mm wide and 2 mm thick. The left leg right layer 5 of the soft robot is made of a non-magnetic double-network cross-linked hydrogel and has a size 20 mm long, 10 mm wide and 2 mm thick. The left leg right layer 5 of the soft robot is adhered to the left leg left layer 4 of the soft robot. As shown in FIG. 4, the right leg 3 of the soft robot has a left and right two-layered structure. The right leg left layer 6 of the soft robot is made of a non-magnetic double-network cross-linked hydrogel and has a size 20 mm long, 10 mm wide and 2 mm thick. The right leg right layer 7 of the soft robot is made of a temperature-responsive hydrogel with added magnetic nanoparticles 8 and has a size 20 mmm long, 10 mm wide and 2 mm thick. The right leg left layer 6 of the soft robot is adhered to the right leg right layer 7 of the soft robot. Magnetically programmed treatment is performed on the magnetic nanoparticles 8 in the left leg left layer 4 of the soft robot and the right leg right layer 7 of the soft robot so that the magnetic nanoparticles 8 are distributed evenly in a rectangular array in the temperature-responsive hydrogel. As shown in FIG. 5, the magnetically programmed treatment includes placing the temperature-sensitive hydrogel with added magnetic nanoparticles 8 of nano-sized $Fe_3O_4$ in a vertical magnetic field (shown as H in FIG. 5) environment during the manufacture process, so that when gelation is completed, the nano-sized $Fe_3O_4$ particles added to the temperature-sensitive hydrogel are arranged vertically. Alternatively, instead of a vertical magnetic field, as shown in FIG. 5 only as an example, the included angle between a direction of the magnetic field H and a length direction of the left leg left layer 4 of the soft robot is 60° to 120°. The length here is merely the length of the cuboid represented in FIG. 5. Seen from the position where the left leg left layer 4 is adhered, as shown in FIGS. 1 and 3, the included angle between the direction of the magnetic field H and a height direction of the left leg left layer 4 of the soft robot is 60° to 120°.

Figure 2:
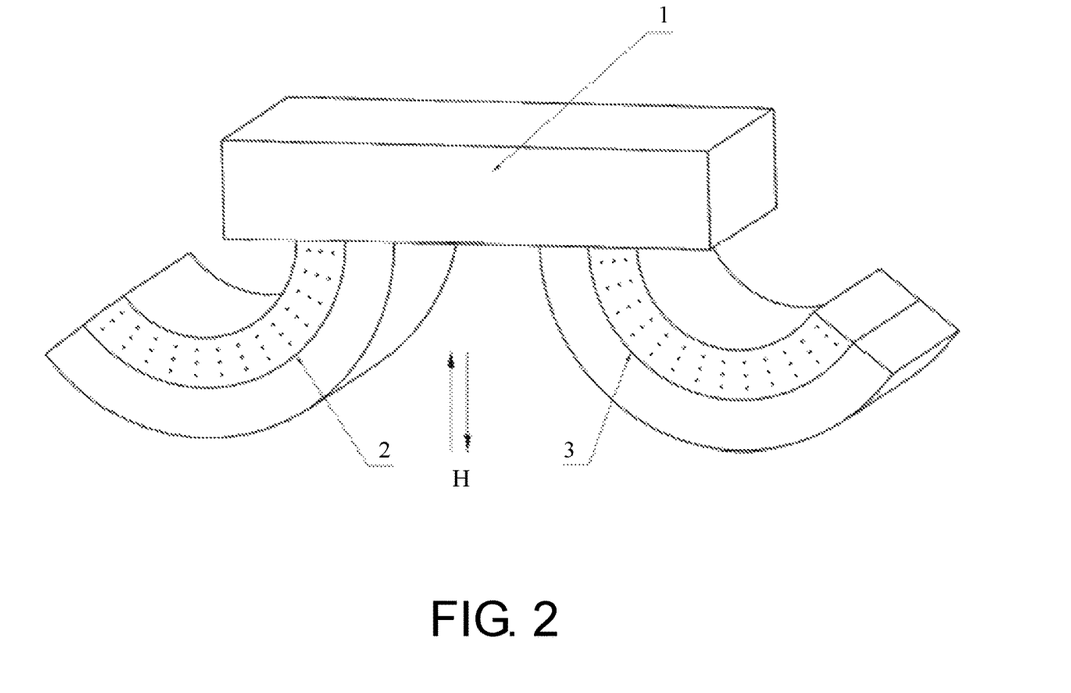
FIG. 2 is a schematic view of a state in which both legs are bent in an alternating magnetic field of a robot according to a first embodiment.
Figure 6:
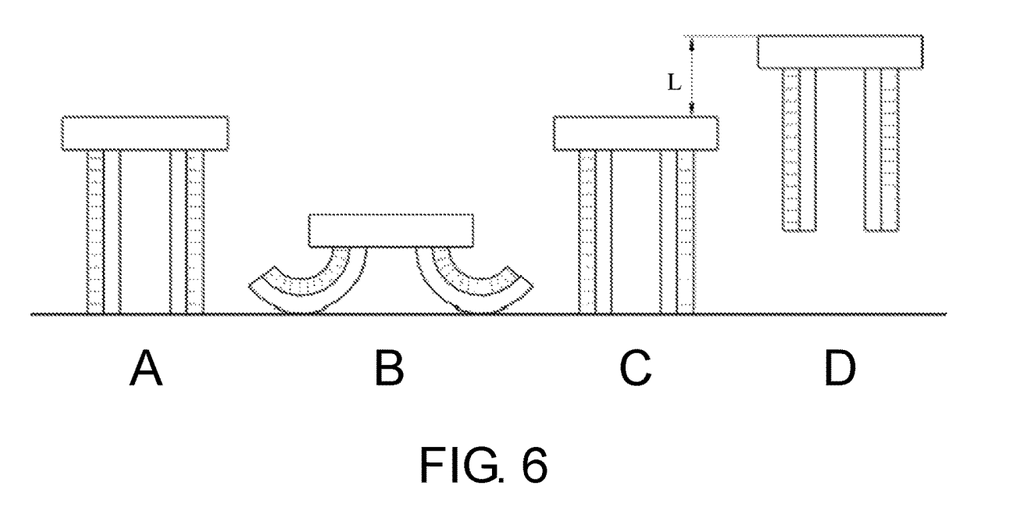
FIG. 6 is a schematic view of a hopping gait of a robot according to the present invention.

During operation of the first embodiment, as shown in FIG. 6, under a room temperature of 25° C., the left leg 2 of the soft robot and the right leg 3 of the soft robot are normally spread vertically as shown in FIG. 1, when the soft robot is in gait A. In transition from gait A to gait B, the soft robot is placed in an environment of alternating magnetic field H shown in FIG. 2. As the left leg left layer 4 and right leg right layer 7 of the soft robot have gone through magnetically programmed treatment, the magnetic nanoparticles 8 therein generate heat in the alternating magnetic field H due to magnetocaloric effect. When the temperature reaches 33° C., the left leg left layer 4 of the soft robot and the right leg right layer 7 of the soft robot are shortened vertically. As the left leg right layer 5 of the soft robot and the right leg left layer 6 of the soft robot are made of a non-magnetic double-network cross-linked hydrogel, the two layers of the legs of the soft robot go through unequal amounts of deformation. Therefore, the left leg 2 of the soft robot is bent to left, and the right leg 3 of the soft robot is bent to right. The overall weight center of the soft robot is lowered due to the gravity, thereby achieving gait B in which the soft robot is in a "π" shape. When the soft robot achieves gait B, the alternating magnetic field is removed, so that the elastic potential energy in the legs of the soft robot is released and converted into kinetic energy that causes the soft robot to move upward. When the legs of the soft robot are straightened, gait C is achieved. Thereafter, the soft robot is disengaged from the contact surface and move further upward over a distance L due to inertia to reach the peak point. That is, the soft robot jumps up to achieve gait D.

Figure 7:
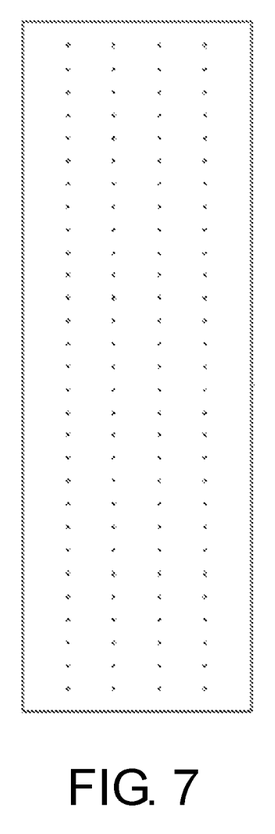
FIG. 7 shows the dense arrangement in a height direction of magnetic nanoparticles according to the present invention.
Figure 8:
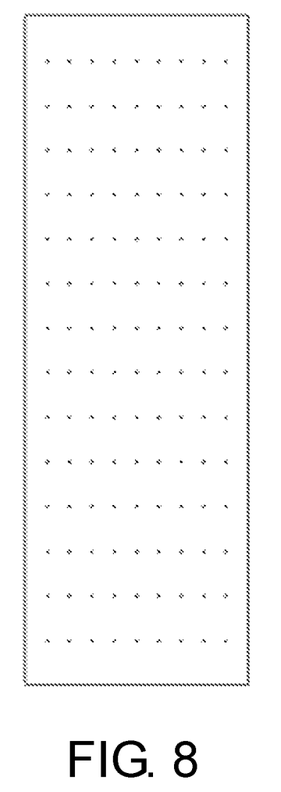
FIG. 8 shows the dense arrangement in a width direction of magnetic nanoparticles according to the present invention.
Figure 9:
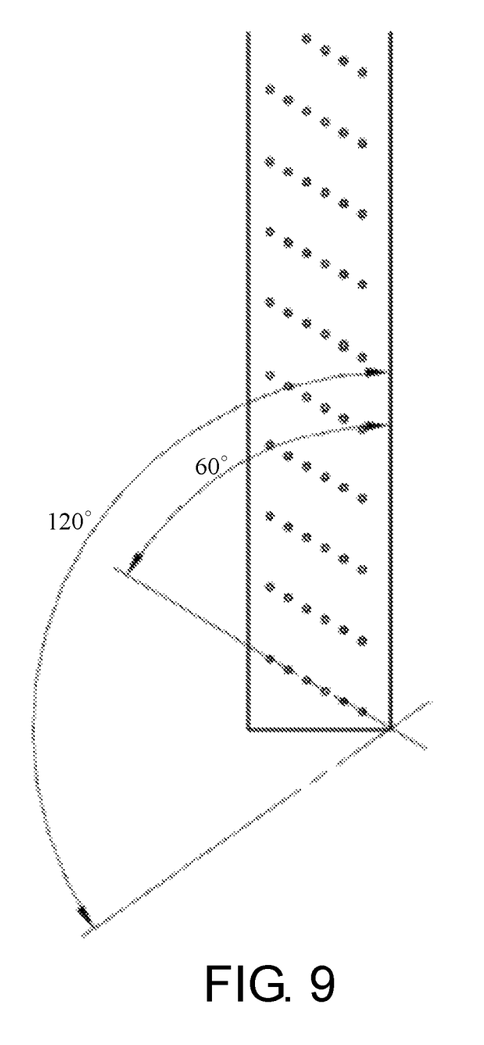
FIG. 9 shows the oblique arrangement of magnetic nanoparticles according to the present invention.

As shown in FIG. 7, the magnetic nanoparticles 8 in the rectangular array are arranged densely in a height direction and arranged sparsely in a width direction inside the temperature-responsive hydrogel. The magnetically programmed temperature-sensitive hydrogel has a greater amount of deformation in the height direction and less amount of deformation in the width direction during deformation. As shown in FIG. 8, the magnetic nanoparticles 8 in the rectangular array are arranged sparsely in the height direction and arranged densely in the width direction inside the temperature-responsive hydrogel. The magnetically programmed temperature-sensitive hydrogel has a less amount of deformation in the height direction and a greater amount of deformation in the width direction during deformation. As shown in FIG. 9, the magnetic nanoparticles 8 in the rectangular array have an included angle of 60° to 120° between the length direction and the height direction inside the temperature-responsive hydrogel.

Figure 10:
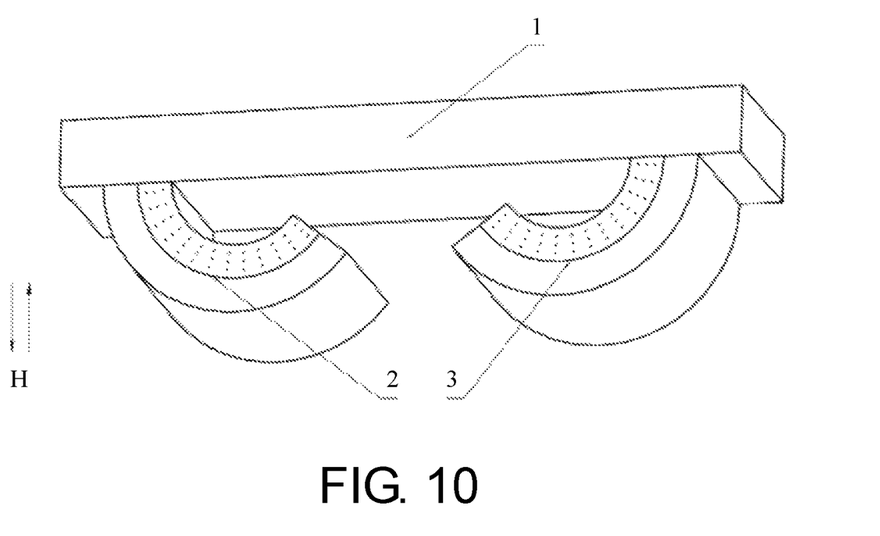
FIG. 10 is a schematic view of a state in which both legs are bent in an alternating magnetic field of a robot according to a second embodiment.

As shown in FIG. 10, the second embodiment differs from the first embodiment in that the left leg right layer 5 of the soft robot is made of a temperature-responsive hydrogel with added magnetic nanoparticles 8 and the left leg left layer 4 of the soft robot is made of a non-magnetic double-network cross-linked hydrogel. The right leg right layer 7 of the soft robot is made of a non-magnetic double-network cross-linked hydrogel and the right leg left layer 6 of the soft robot is made of a temperature-responsive hydrogel with added magnetic nanoparticles 8. That is, in the first embodiment, the left leg 2 of the soft robot and the right leg 3 of the soft robot are made of a temperature-responsive hydrogel with added magnetic nanoparticles 8 on the outer side and of a non-magnetic double-network cross-linked hydrogel on the inner side. In the alternating magnetic field H, the left leg 2 of the soft robot and the right leg 3 of the soft robot are both bent outward. In the second embodiment, the left leg 2 of the soft robot and the right leg 3 of the soft robot are made of a temperature-responsive hydrogel with added magnetic nanoparticles 8 on the inner side and of a non-magnetic double-network cross-linked hydrogel on the outer side. In the alternating magnetic field H, the left leg 2 of the soft robot and the right leg 3 of the soft robot are both bent inward.

The embodiments described are preferred implementations of the present invention, but the present invention is not limited to the implementations described above. Without departing from the essence of the present invention, any obvious improvement, substitution or variants that can be made by a person skilled in the art shall fall within the protection scope of the present invention.

What is claimed is:

1. A magnetically driven hopping soft robot based on magnetically programmed temperature-sensitive hydrogels, comprising first moving bodies and a second moving body, wherein a plurality of the first moving bodies are distributed evenly on a bottom portion of the second moving body, the first moving bodies are made of a temperature-responsive hydrogel containing magnetic particles, and an alternating magnetic field is applied to the first moving bodies to cause the first moving bodies to deform, the first moving bodies have a two-layered structure, a first layer is made of a double-network cross-linked hydrogel and a second layer is made of a temperature-responsive hydrogel containing magnetic particles, and an alternating magnetic field is applied to the first moving bodies in such a manner that an amount of deformation of the second layer is greater than that of the first layer, the second layer is made of a temperature-responsive hydrogel with added magnetic nanoparticles, and magnetically programmed treatment is performed on the temperature-responsive hydrogel with added magnetic nanoparticles, so that the magnetic nanoparticles are distributed evenly in a rectangular array inside the temperature-responsive hydrogel, wherein at least two of the first moving bodies are distributed evenly on the bottom portion of the second moving body and the second layer is positioned on an outer side of the first layer, and an alternating magnetic field is applied to the second layer to cause the first moving bodies and the second moving body to deform into a "π" shape.

2. The magnetically driven hopping soft robot based on the magnetically programmed temperature-sensitive hydrogels according to claim 1, wherein the magnetic nanoparticles in the rectangular array are arranged densely in a height direction and arranged sparsely in a width direction inside the temperature-responsive hydrogel.

3. The magnetically driven hopping soft robot based on the magnetically programmed temperature-sensitive hydrogels according to claim 1, wherein the magnetic nanoparticles in the rectangular array are arranged sparsely in a height direction and arranged densely in a width direction inside the temperature-responsive hydrogel.

4. The magnetically driven hopping soft robot based on the magnetically programmed temperature-sensitive hydrogels according to claim 1, wherein the magnetic nanoparticles in the rectangular array have an included angle of 60° to 120° between a length direction and a height direction inside the temperature-responsive hydrogel.

5. The magnetically driven hopping soft robot based on the magnetically programmed temperature-sensitive hydrogels according to claim 1, wherein the magnetically programmed treatment includes adding the magnetic nanoparticles to the temperature-responsive hydrogel and putting a gelation process of a mixture in a uniform magnetic field environment.

\* \* \* \* \*